Figure 1:
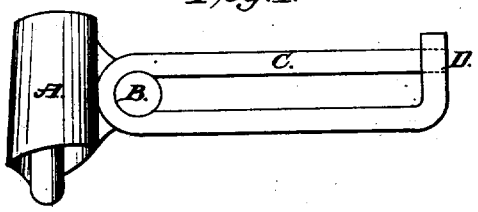

J. G. POWELL.

Clamp for Sewing-Machine Attachments.

No. 6,306. Reissued Feb. 23, 1875.

Witnesses:

James P. Petit

John B. Devine

Inventor:

John G. Powell

Per

Lloyd Wiegand

Attorney.

THE GRAPHIC CO. PHOTO-LITH. 39 & 41 PARK PLACE, N.Y.

UNITED STATES PATENT OFFICE.

JOHN G. POWELL, OF PHILADELPHIA, PENNSYLVANIA.

IMPROVEMENT IN CLAMPS FOR SEWING-MACHINE ATTACHMENTS.

Specification forming part of Letters Patent No 142,812, dated September 16, 1873; reissue No. 6,306, dated February 23, 1875; application filed December 8, 1873.

*To all whom it may concern:*

Be it known that I, JOHN G. POWELL, of the city and county of Philadelphia, and State of Pennsylvania, have invented a certain new and useful adjustable clamp for attaching hemmers and other attachments to the decks or work-supporting tables of sewing-machines; and I do hereby declare the following to be a sufficiently full, clear, and exact description thereof to enable persons skilled in the art to make and use the same.

The nature of my invention consists in fixing to the attachment a short cylindrical or conical journal, permanently fastened to the attachment, with a vertical axis, and fitting upon this journal, so that it may be readily detached, one end of a radial slotted arm, so arranged that it may be turned on the journal to adjust it, and being compressed, it clamps or binds itself securely on the journal; also, in forming a spring-latch on the opposite or open end of the radial slotted arm, by which it may be held shut when adjusted angularly on the journal.

I will now proceed to describe this invention more fully and particularly, referring in so doing to the drawing annexed, and the letters of reference marked thereon.

Figure 5:
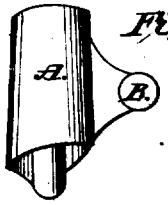
Figure 2:
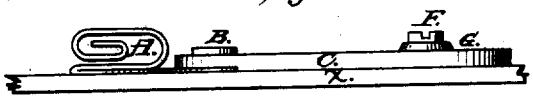
Figure 3:
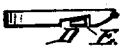
Figure 4:
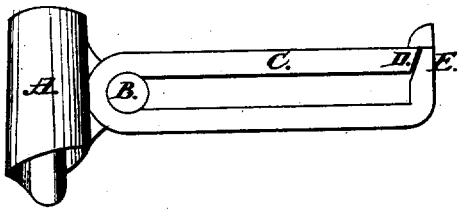

Figure 1 shows a plan. Fig. 2 shows a side elevation; Fig. 3, an end elevation. Fig. 4 shows a plan of a modified form of latch; and Fig. 5 a plan of the attachment without the clamp.

The same letters of reference apply to the same parts in the several figures.

A represents a hemmer, to which is attached a plate, having a journal, B, fastened on it. C is a slotted arm, formed so as to fit at one end around the journal B, and made open at the other end. When the sides of the arm C are pressed toward each other the link pinches with sufficient friction on the journal B to securely retain it in any angular adjustment in which it may be placed. A latch, D, is formed on one of the open ends of the arm C, engaging in a notch, E, on the other open end of the arm, and, when so engaged, holds the arm tightly on the journal B. A screw, F, and washer G serve to hold the arm to the plate X.

The advantage of this invention consists in the facility by which attachments can be adjusted to sewing-machines having the clamping-holes in different positions on the plate.

This invention may be used without the latch by holding the arm shut by the screw F and washer G; but I think the latch useful and convenient.

In using this device the latch D is released from the notch E, and the hemmer A or other attachment is placed in the proper position on the sewing-machine to be worked, and the slotted arm C is then turned on the journal B until the slot coincides with the clamping screw-hole in the machine deck or table. The sides of the arm C are then pressed together, so that the latch D fastens in the notch E, and the screw F and washer G are applied, and hold the arm C and attachment A securely to the machine.

The latch shown in Fig. 4 differs only from that shown in the preceding figures in having the notch E cut in a perpendicular direction instead of horizontal.

What I claim as my invention, and desire to secure as such by Letters Patent, is—

1. As an improved article of manufacture, a sewing-machine attachment provided with a vertical journal permanently attached thereto, and adapted to be grasped on its convex surface and held by friction thereon in a radially-adjustable clamp to the deck or bed of a sewing-machine, as set forth.

2. The vertical pillar or journal B, formed on a sewing-machine attachment, in combination with a radially-adjustable compressible clamp or arm, C, adapted to grasp the sides of said pillar, and provided with a slot for the passage of a screw to hold the same to the deck of a sewing-machine, substantially as described.

3. In combination with the compressible arm C, adapted to grasp the sides of the journal B, formed on the sewing-machine attachment, a latch, D, formed thereon, substantially as and for the purpose described.

JOHN G. POWELL.

Witnesses:

JOHN B. DEVINE,

E. F. GRUSSENMYER.